Figures 1, 2:
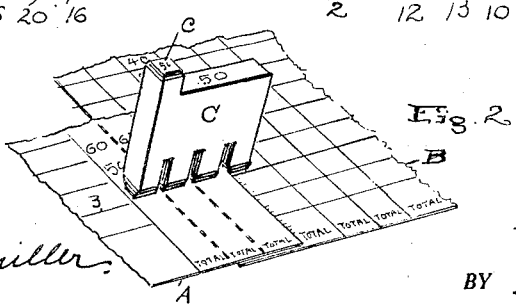

M. S. MILLER.
WAITER'S CHECK OR ORDER SLIP.
APPLICATION FILED NOV. 3, 1919.

1,358,230.

Patented Nov. 9, 1920.
2 SHEETS—SHEET 1.

WITNESS:
Benjamin Miller

INVENTOR.
Morris S. Miller
BY
ATTORNEYS.

M. S. MILLER.
WAITER'S CHECK OR ORDER SLIP.
APPLICATION FILED NOV. 3, 1919.

1,358,230.

Patented Nov. 9, 1920.
2 SHEETS—SHEET 2.

Fig. 3

HOTEL _____
CHECKER _____
PAGE NO. 1
19____

| Waiter 1 | Waiter 2 | Waiter 3 | Waiter 4 | Waiter 5 | Waiter 6 | Waiter 7 | Waiter 8 | Waiter 9 |
|---|---|---|---|---|---|---|---|---|
|  | 1.00 |  |  |  |  |  |  |  |
|  | .40 |  |  |  |  |  |  |  |
|  | .30 |  |  |  |  |  |  |  |
|  | 1.75 |  |  |  |  |  |  |  |
|  | .60 |  |  |  |  |  |  |  |
|  | .50 |  |  |  |  |  |  |  |
|  | .60 |  |  |  |  |  |  |  |
|  | .50 |  |  |  |  |  |  |  |
|  | .60 |  |  |  |  |  |  |  |
|  | .50 |  |  |  |  |  |  |  |
| Total | 6.75 Total | Total | Total | Total | Total | Total | Total | Total |

WITNESS:
Benjamin Miller

INVENTOR.
Morris S. Miller
BY
_____
ATTORNEYS.

UNITED STATES PATENT OFFICE.

MORRIS S. MILLER, OF CLEVELAND, OHIO.

WAITER'S CHECK OR ORDER-SLIP.

1,358,230.   Specification of Letters Patent.   Patented Nov. 9, 1920.

Application filed November 3, 1919. Serial No. 335,461.

*To all whom it may concern:*

Be it known that I, MORRIS S. MILLER, a citizen of the United States, residing at Cleveland, in the county of Cuyahoga and State of Ohio, have invented certain new and useful Improvements in Waiters' Checks or Order-Slips, of which the following is a specification.

This invention relates to an improvement in waiter's checks. The object of the invention is to provide a check or order slip which can be quickly filled out, stamped, and subdivided longitudinally at each longitudinal edge and a plural number of coupons obtained therefrom, whereby a complete satisfactory accounting and registering of any given order can be effected and an accurate record established in connection with a check book, all as more particularly shown and described herein.

In the accompanying drawings, Figure 1 is a form of a complete waiter's check arranged and constructed in accordance with my invention. Fig. 2 is a perspective view of a portion of the waiter's check superposed upon a checking slip, and showing a hand stamp for printing the charge of the given article in parallel columns on both sheets. Fig. 3 is a view of one of the checking sheets used in connection with the waiter's check or order slip.

The invention comprises a check or order slip A having a central area 2 extending longitudinally of the slip and which is subdivided by a series of parallel lines 3 upon which various articles may be separately enumerated. A divisional space 4 extends longitudinally of this central area within which the amount or number of orders may be given for each article. The upper portion 5 of this central area is left blank to receive any suitable printing matter to identify the hotel or restaurant where the slip is in use. The right hand portion of this central or main body portion 2 is left blank, especially opposite the divisional lines 3, so that the charge for each article may be entered thereon in column formation. The upper end of the central portion between the slip is also provided with a series of separate marking spaces 6, 7, 8 and 9 upon which the number of guests, the number of the table, the check number, and the number of the waiter, may be written or printed. The words "Guest," "Table," "Check" and "Waiter," are preferably printed permanently in the said spaces 6 to 9, inclusive.

The central or main portion 2 of the check above described is in one piece, and has detachable coupon portions on three sides thereof, and the coupons along both of its longitudinal edges are in multiple. Thus, the coupons at the right comprise two parallel detachable coupons 10 and 11 corresponding to the blank column or spaced border portion 12 at the right of central main portion 2 of the check and the divisional line 13 between coupons 10, 11 and 12 are preferably indented or perforated to permit convenient detachment of the coupons from the central portion and from each other, the said perforated lines running parallel with each other longitudinally of the check or slip from the bottom edge to a transverse perforated line 14 which defines the upper edge of the central area or body portion 2 and whereby a separate deposit slip 15 is made a detachable part of main check 2.

This deposit slip is subdivided into spaces bearing printed characters corresponding to the printed characters on the main body of the slip such as "Check", "Table", "Waiter", and the words "Guest" or "Party" together with the word "Meal". Sufficient space is provided in each subdivision of the deposit slip to write in the data required to make the deposit slip and main body correspond. To complete the check or slip and maintain a symmetrical figure or form within rectangular lines the left side comprises a double row of separable coupons 16, each row 16 being divided midway between the bottom edge of the check and the perforated line 14 by a short transverse perforated line 17. In this way the boundary at the left of the central or main body portion 2 of the check is defined by a perforated line 18 with parallel perforations 20 longitudinally of the check from this bottom edge to the transverse line 14. Perforations 20 bisect the perforated line 17. In this way the left side of the check is divided into four coupons of equal size which are detachably connected with the main central portion 2 and with each other and also detachable from the deposit slip at the top. These coupons bear suitable designating characters at one end corresponding to the identifying matter on the main check, and are duplicates of each other.

The detachable charge coupons at the right side of the slip are also provided with blank spaces at their upper ends and with subdivisions with the words "Check", "Waiter" and "Table" printed thereon and sufficient space is allowed beneath each imprint to permit the number of the check, waiter and table to be either printed or written thereon.

From the foregoing it will be seen that the check has a multiple number of removable charge coupons affixed longitudinally and detachably at the right side thereof, and also a multiple number of detachable charge coupons longitudinally at the left side thereof, together with a detachable deposit slip at the top side thereof, and that each detachable coupon has corresponding printed matter thereon, which printed matter corresponds with the printed matter on the main body 2 of the check.

In use and before any one of the coupons are detached, the check or order slip is submitted to a checker who is provided with a checking sheet B, see Fig. 3, which sheet is subdivided into parallel horizontal and vertical columns or spaces corresponding in width to the charge coupons and in position to the transverse spaces separated by lines 3 on the main check. The vertical columns on sheet B are numbered consecutively to identify the waiters, and when a check or order slip is submitted to the checker he imprints the charge on both the checking sheet and the order slip by a single stamping action involving the use of a hand stamp C as illustrated in Fig. 2 where the check or order slip A is shown as superposed upon the checking sheet B. The coupons at the left side of the check may be printed independently by an independent stamping portion $c$ on stamp C.

By having the detachable coupons in multiple on opposite sides of the check and a deposit slip at the top and marking these parts correspondingly it is exceedingly difficult or impossible for a waiter alone or in collusion with others to enter false charges or carry away any article of food surreptitiously and with intent to defraud. Furthermore, the checking and entering operations are greatly simplified and very quickly performed without error.

The check is used as follows: The coupon or deposit slip 15 is used to check the cover charge or fee exacted for dancing or an entertainment. Thus the waiter in taking an order marks the particular meal to be served and the number of persons at any given table upon the deposit slip. The number of guests at the table is also marked within space 6 of the main check. The price of admission or fee exacted is determined by the time of the day, i. e., the meal, and the number of guests at the table must be accounted for when the main check is paid.

Upon writing down the order upon the main check 2 the waiter detaches the deposit slip 15 and hands it to one of the captains or assistant head waiters whose duty is to check up the number of persons at each table, so that the hotel will be safe-guarded as to the cover charge or fee for admission. The waiter then takes the order slip or check 2 to the witchen, but before he delivers the goods to the table, a checking clerk uses stamp C to print the charges opposite each written order in the three vertical spaces at the right side, as indicated in Fig. 2. In this proceeding the charge for each article is also printed on the checking sheet B which remains in the possession of the checking clerk until a final audit is made. The total is also stamped or written at the bottom of the three vertical spaces and the waiter collects this amount at the end of the meal.

In filling the order the waiter may also be frequently called upon to obtain articles from supply departments where the charge therefor is placed against the waiter individually. To obtain these separate articles, the waiter must fill out and remove one or more of the coupons 16 at the left side of the check, but before detaching these coupons the checking clerk prints the charge on the coupon and the same charge is stamped in the parallel columns at the right side of the check. If the waiter fails to write each item on the main check and make the charge, the omission becomes manifest when the coupons 16 are turned in to the checking clerk from the supply departments.

Before the check is handed to the guest the waiter detaches coupon 11 from the extreme outer right hand edge of the check and submits it to the headwaiter who retains it as a receipt. The waiter then tears off coupon 10 and retains it as his receipt. The main check 2 is delivered to the cashier with the total amount called for by the check.

In the final audit, the captain or assistant headwaiter turns in his accumulated deposit slips, and the various supply departments turn in their coupons 10, and each of these must correspond with the main check in the hands of the checking clerk or auditor. If not, the waiter's receipt and the head-waiter's receipt must be produced and any discrepancies accounted for.

What I claim is:

1. A waiter's check comprising a main body portion marked with subdivisions transversely and longitudinally and bordered at each longitudinal edge with a multiple number of coupons longitudinally detachable from the body of said strip and longitudinally from each other on parallel lines, and including a deposit slip detachably connected transversely with one end of said main body portion and the ends of all of said border coupons, said main body portion and each of the coupons and deposit slip having corresponding printed matter thereon.

2. A waiter's check comprising a main body portion marked with subdivisions transversely and longitudinally and bordered at each longitudinal edge with a multiple number of coupons longitudinally detachable from the body of said strip and longitudinally from each other on parallel lines, and including a deposit slip detachably connected transversely with one end of said main body portion and the ends of all of said border coupons, said main body portion and each of the coupons and deposit slip having corresponding printed matter thereon, and the border coupons at one side of said body portion being separably connected at an intermediate point between their opposite ends.

3. A waiter's check having a plurality of horizontal delineated spaces in which to write items in successive order and which check is provided with an integral portion and delineated space at its longitudinal edge opposite said horizontal spaces and which is further provided at one end with separate delineated marking spaces bearing the words "Guest," "Table," "Check" and "Waiter," and said check having a plural number of removable charge coupons detachably affixed longitudinally to each other and with one longitudinal side edge of said check and each of said coupons having separate spaces marked with the words "Check," "Waiter" and "Table," and said check further having the detachable deposit slip at one end thereof connected with said coupons and divided into separate spaces bearing the words "Check," "No. in party," "Meal," "Table" and "Waiter," and two of said detachable longitudinal coupons bearing the words "Waiter's receipt" and "Head-waiter's receipt," respectively, and each of the detachable coupons thereon bearing corresponding numbers for the check and for the waiter.

Signed at Cleveland, in the county of Cuyahoga, and State of Ohio, this 30th day of October, 1919.

MORRIS S. MILLER.